(12) United States Patent
Trainer et al.

(10) Patent No.: US 11,837,894 B2
(45) Date of Patent: Dec. 5, 2023

(54) ELECTRICAL POWER SYSTEM

(71) Applicant: Rolls-Royce plc, London (GB)

(72) Inventors: David R Trainer, Derby (GB);
Francisco Javier Chivite Zabalza, Stafford (GB); Mark Sweet, Chesterfield (GB); Gian Incerpi, Buckingham (GB); Luke George, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/957,778

(22) Filed: Sep. 30, 2022

(65) Prior Publication Data

US 2023/0136376 A1    May 4, 2023

(30) Foreign Application Priority Data

Oct. 28, 2021 (GB) ...................... 2115513

(51) Int. Cl.
*H02J 7/00* (2006.01)
*H02M 3/335* (2006.01)
*B64D 27/24* (2006.01)

(52) U.S. Cl.
CPC ............ *H02J 7/0031* (2013.01); *B64D 27/24* (2013.01); *H02M 3/33573* (2021.05); *B64D 2221/00* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2005/0146814 A1 | 7/2005 | Sellier et al. | |
| 2011/0317321 A1 | 12/2011 | Vogel | |
| 2014/0177298 A1* | 6/2014 | Reymond | H02M 1/32 363/56.03 |
| 2014/0266102 A1* | 9/2014 | Mikolajczak | G05F 1/565 323/273 |
| 2021/0226468 A1* | 7/2021 | Zagrodnik | H02J 7/00309 |

FOREIGN PATENT DOCUMENTS

| | | |
|---|---|---|
| CN | 105656019 A | 6/2016 |
| CN | 113555854 A | 10/2021 |
| EP | 2 779 346 A2 | 9/2014 |

(Continued)

OTHER PUBLICATIONS

Mar. 13, 2023 Extended European Search Report Issued in European Patent Application No. 22 198 313.3.

(Continued)

*Primary Examiner* — Jared Fureman
*Assistant Examiner* — Aqeel H Bukhari
(74) *Attorney, Agent, or Firm* — Oliff PLC (57) ABSTRACT

An electrical power system including: an electrical power source, a power electronics converter, an electrical network, a current limiting diode and a controllable circuit interruption device, wherein: the current limiting diode is configured to limit a fault current passing between the electrical power source and the electrical network in a fault condition; and the controllable circuit interruption device is configured to interrupt the fault current in response to a determination that the electrical power system is in the fault condition.

16 Claims, 5 Drawing Sheets

(56)  References Cited

FOREIGN PATENT DOCUMENTS

| EP | 2 874 257 A1 | 5/2015 |
|----|--------------|--------|
| FR | 2 951 015 A1 | 4/2011 |
| WO | 95/07548 A1 | 3/1995 |
| WO | 2008/141595 A1 | 11/2008 |
| WO | 2013/093066 A1 | 6/2013 |
| WO | 2015/175346 A1 | 11/2015 |

OTHER PUBLICATIONS

Apr. 7, 2022 Combined Search and Examination Report Issued in GB Patent Application No. 2115513.0.

* cited by examiner

ELECTRICAL POWER SYSTEM

CROSS-REFERENCE TO RELATED APPLICATIONS

This specification is based upon and claims the benefit of priority from United Kingdom Patent Application No. 2115513.0, filed on 28 Oct. 2021, the entire contents of which are incorporated herein by reference.

FIELD OF THE DISCLOSURE

The present disclosure relates to an electrical power system.

BACKGROUND

An electrical power system may include apparatus for protecting components of the electrical power system from a fault current. The fault current may originate from, for example, an electrical energy storage device of the electrical power system or an electrical network of the power system. In particular, in an electrical power system comprising an electrical energy storage device with a very high electrical energy delivery capacity and a very low source impedance, a fault current which represents an effective short-circuit across a pair of terminals of the electrical energy storage device may lead to an extremely sharp rise in current. The fault current can cause damage to other components of the electrical power system. It is known to incorporate thermal fuses into an electrical power system in order to avoid such damage. However, thermal fuses must be replaced after every fault.

It is therefore desirable to provide an improved electrical power system.

SUMMARY

According to a first aspect there is provided an electrical power system comprising: an electrical power source, a power electronics converter, an electrical network, a current limiting diode and a controllable circuit interruption device, wherein: the current limiting diode is configured to limit a fault current passing between the electrical power source and the electrical network in a fault condition; and the controllable circuit interruption device is configured to interrupt the fault current in response to a determination that the electrical power system is in the fault condition.

The current limiting diode and the controllable circuit interruption device may combine synergistically to reduce a required current rating of the controllable circuit interruption device. This may in turn reduce the mass of the electrical power system, which may be a particular advantage in an aircraft system. For example, a controllable circuit interruption device (e.g., a contactor) may be unable to open in the presence of a very large fault current due to, e.g., contactor arcing unless the contactor is significantly overrated compared to the rating of the electrical power source. However, when combined with the current limiting diode, the fault current may be reduced to a lower level for an amount of time long enough for a controllable circuit interruption device with a relatively low current rating to interrupt the fault current.

Thus, a current rating of the controllable circuit interruption device may be relatively low. The current rating of the controllable circuit interruption device may be between one and five times a current rating of the electrical power source. The current rating of the controllable circuit interruption device may be less than four times, less than three times, or even less than 2.5 times the current rating of the electrical power source. The current rating of the controllable circuit interruption device may be between 1.25 and 2.5 times the current rating of the electrical power source, and may be between 1.5 and 2.0 times the current rating of the electrical power source. Such values may provide a sweet spot in a trade-off between system mass reduction and assurance against faults.

It may be that the controllable circuit interruption device comprises a controllable contactor and the electrical power system further comprises a controller configured to control the controllable contactor. In other embodiments the controllable circuit interruption device may comprise a semiconductor device such as a solid-state circuit breaker.

The current limiting diode may be provided with a heat sink. The heat sink provided to the current limiting diode may comprise a phase-change material configured to absorb heat from the current limiting diode in the fault condition.

It may be that the electrical power source is configured to provide an electrical potential difference to the electrical power system of at least 270 V. It may be that the electrical power source is configured to provide an electrical potential difference to the electrical power system of 270 V, 540 V, 800V or 1080 V or at least any of these values.

It may be that the electrical power source comprises a battery (e.g. a high-density battery). Other electrical power sources, including fuel cells, may be used.

The power electronics converter may comprise a DC to DC converter. The power electronics converter may comprise a DC to AC to DC converter.

It may be that the electrical power source is a first electrical power source, and wherein the electrical network comprises a second electrical power source. Further, it may be that the second electrical power source comprises an electrical generator and/or a capacitor.

In addition, it may be that the current limiting diode is a first current limiting diode, and wherein the electrical power system further comprises a second current limiting diode, the first current limiting diode and the second current limiting diode being electrically connected and together forming a bidirectional current limiting device.

According to a second aspect, there is provided an aircraft power and propulsion system comprising the electrical power system of the first aspect.

According to a third aspect, there is provided an aircraft comprising an electrical power system in accordance with the first aspect or an aircraft power and propulsion system in accordance with the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
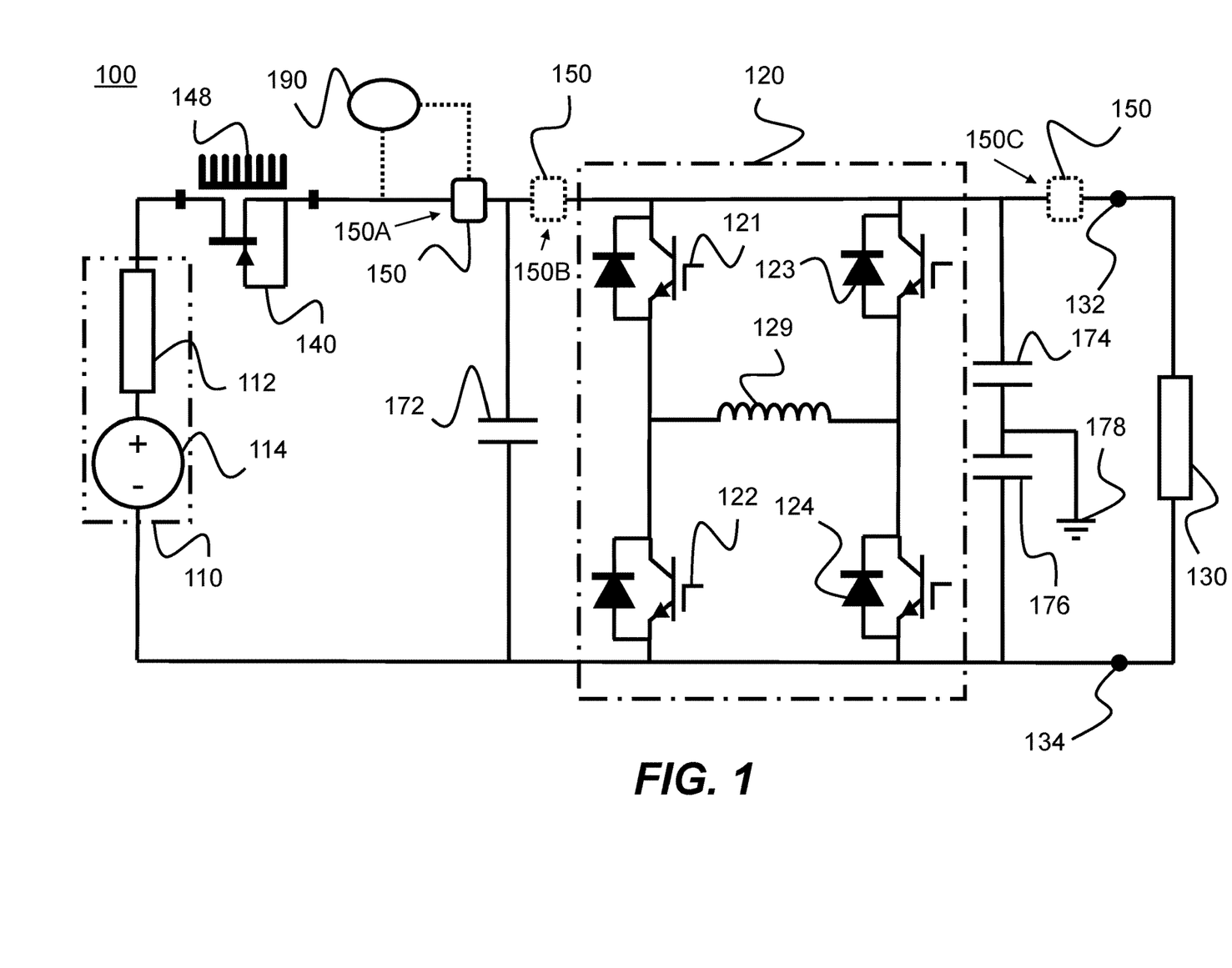
FIG. 1 is a circuit diagram which shows a first example electrical power system.

FIG. 1 shows an electrical power system 100 according to a first example which comprises an electrical power source 110, a power electronics converter 120, an electrical network 130 connected between terminals 132 and 134, a current limiting diode 140 and a controllable circuit interruption device 150. In the example of FIG. 1, the electrical network is represented by a load 130, an internal impedance of the electrical power source 110 is represented by a resistor 112 and an electrical energy delivery capacity of the electrical power source is represented by a voltage source 114.

In the example shown in FIG. 1, the power electronics converter 120 comprises a DC to DC converter and the electrical network 130 is a DC electrical network. The DC to DC converter may comprise a plurality of transistors and an inductor coil 129. In FIG. 1, the DC to DC converter comprises a first transistor 121, a second transistor 122, a third transistor 123 and a fourth transistor 124. The power electronics converter 120 provides a regulation function to the electrical power system 100, as is described in further detail below. In other examples, the power electronics converter 120 comprises a DC to AC converter and the electrical network 130 is an AC electrical network.

The current limiting diode 140 comprises a junction field-effect transistor (JFET) provided with a source, a drain and a gate, with the gate being shorted to the source and the drain being electrically connected to the source by an n-channel. Accordingly, the current limiting diode 140 is configured as a 2-terminal device which permits an electric current to be conducted through the n-channel between the source and the drain. The current limiting diode 140 has an electrical resistance which is primarily defined by a size of a depletion region of the n-channel. The depletion region is a region of the n-channel in which there are no free charge carriers. As a result, an electric current cannot be conducted through the depletion region and is instead conducted through a current-carrying path within the n-channel that is bounded by the depletion region.

As current flows through this current-carrying path, a potential difference is formed between the source and drain of the channel. As this potential increases with current eventually the channel is pinched off, i.e. the drain potential is greater than the threshold voltage. This causes the current to saturate and significant voltage to build up across the device and the electrical characteristic to transfer from a linear relationship between drain voltage and current to a constant current mode.

The size of the depletion region corresponds to a magnitude of an electric current being passed through the n-channel from the drain to the source. That is to say that if the magnitude of the electric current passing through the n-channel from the drain to the source is large, the size of the depletion zone will also be large and the electrical resistance of the current limiting diode 140 becomes large. However, the size of the depletion region does not correspond to a magnitude of an electric current being passed in the opposite direction from the source to the drain.

A relationship between the electrical resistance of the current limiting diode 140 and the magnitude of the electric current passing from the drain to the source is highly non-linear. In other words, the current limiting diode 140 operates in a manner which is analogous to a highly non-linear unidirectional resistor in that the electrical resistance of the current limiting diode 140 increases rapidly as the magnitude of the electric current passing from the drain to the source increases above a saturation threshold. Accordingly, the current limiting diode 140 "saturates" at a near constant current level.

In a normal operating condition of the first electrical power system 100, a magnitude of an electric current being conducted through the current limiting diode 140 from the drain to the source is relatively low. Accordingly, the size of the depletion region within the current limiting diode 140 is relatively small and the electrical resistance of the current limiting diode 140 is also relatively small. Therefore, an amount of resistive heat dissipated by the current limiting diode 140 when the electrical power system is in the normal operating condition is low. As a result, a power insertion loss associated with the inclusion of the current limiting diode 140 within the electrical power system 100 is minimised in the normal operating condition.

On the other hand, in a fault condition of the first electrical power system 100, a fault in the electrical power system 100 may lead to a magnitude of an electric current being conducted through the current limiting diode 140 from the drain to the source becoming extremely large in a very short period of time.

For example, if the internal impedance 112 of the electrical power source 110 is very low and the electrical energy delivery capacity 114 of the electrical power source 110 is very high, a fault in the electrical power system 100 which originates in the electrical network 130 or the power electronics converter 120 and which presents an effective short circuit across the electrical power source 110 may cause a magnitude of a fault current to be conducted through the electrical power system 100 which reaches an order of thousands of Amperes within a very short period of time. This may be because the magnitude of the fault current is only limited by the internal impedance 112 of the electrical power source 110. If the magnitude of the fault current were not limited and/or interrupted, the magnitude of the fault current could rise beyond a tolerance limit of the power electronics converter 120 and/or a component of the electrical network 130. The tolerance limit of the power electronics converter 120 may be associated with a switching capacity of at least one of the plurality of transistors.

In this example, the fault originates from the electrical network 130 or the power electronics converter 120 and the fault current is therefore conducted through the current limiting diode 140 from the drain to the source. If the fault current exceeds the saturation threshold of the current limiting diode 140, the current limiting diode 140 almost instantaneously limits the magnitude of the fault current originating from the electrical network 130 or the power electronics converter 120 by providing a greatly increased resistance through the n-channel. However, in another example, it may be that a fault originates from the electrical power source 110 and a fault current is therefore conducted through the current limiting diode 140 from the source to the drain.

The size of the depletion region of the n-channel does not correspond to a magnitude of an electric current being passed in the opposite direction from the source to the drain. Therefore, the current limiting diode 140 is not able to limit the magnitude of a fault current caused by a fault originating from the electrical power source 110. For this reason, an orientation of the current limiting diode 140 within the electrical power system 100 dictates whether the current limiting diode 140 is able to limit a fault current caused by a fault originating from the electrical network 130 or the power electronics converter 120 or a fault current caused by a fault originating from the electrical power source 110.

In practice, the current limiting diode 140 is only able to respond to a development of the fault current caused by a fault originating from the electrical network 130 or the power electronics converter 120 and to limit the fault current within a response time period of the current limiting diode 140. The response time period of the current limiting diode 140 may be, for example, of an order of a number of nanoseconds. Further, the current limiting diode 140 is configured to ensure that the magnitude of the fault current is maintained below the tolerance limit of the electrical power source 110, the power electronics converter 120 and/or a component of the electrical network 130.

However, while the current limiting diode 140 is able to respond to the development of the fault current almost instantaneously (being limited only by the response time period of the current limiting diode 140), the greatly increased electrical resistance provided by the current limiting diode 140 causes the resistive heat dissipated by the current limiting diode 140 to become extremely high. In practice, the resistive heat dissipated by the current limiting diode in the fault condition may be so high that a maximum internal temperature of the current limiting diode 140 rises above a threshold temperature at which damage to and loss of function of the current limiting diode 140 may occur. A duration between the development of the fault current and a time at which the maximum internal temperature exceeds the threshold temperature is referred to as a critical time period. The critical time period may be, for example, of an order of a number of milliseconds.

The controllable circuit interruption device 150 is configured to interrupt the fault current shortly after the development of the fault current in response to a determination that the electrical power system 100 is in the fault condition. The controllable circuit interruption device 150 may monitor an electrical current passing between the electrical power source 110 and the electrical network 130 in order to determine whether the electrical power system 100 is in the fault condition. However, the controllable circuit interruption device 150 is only able to respond to the development of the fault current and interrupt the fault current within a response time period of the controllable circuit interruption device 150. The response time period of the controllable circuit interruption device 150 is longer than the response time period of the current limiting diode 140. Accordingly, the current limiting diode 140 and the controllable circuit interruption device 150 are configured to co-operate in use so as to limit and then to interrupt a fault current passing between the electrical power source and the electrical network 130 in the fault condition. The current limiting diode 140 and the controllable circuit interruption device 150 provide the electrical power system 100 with a resettable protection system against a fault current passing between the electrical power source 110 and the electrical network 130 in the fault condition.

In the example of FIG. 1, the current limiting diode 140 is orientated within the electrical power system 100 such that the current limiting diode 140 and the controllable circuit interruption device 150 are configured to co-operate in use so as to limit and then to interrupt a fault current originating from the electrical network 130 or the power electronics converter 120. However, it will be appreciated that the current limiting diode 140 may be otherwise orientated within the electrical power system 100 such that the current limiting diode 140 and the controllable circuit interruption device 150 are configured to co-operate in use so as to limit and then to interrupt a fault current originating from the electrical storage device 110.

The controllable circuit interruption device 150 may comprise, for example, a contactor, any other type of mechanical switch or a semiconductor-type switch which is electrically controllable (e.g. a solid-state circuit breaker). Use of a contactor or another type of mechanical switch provides a physical circuit break (that is, Galvanic isolation) in the fault condition, which is associated with improved safety of the electrical power system 100.

In the example shown in FIG. 1, the controllable circuit interruption device 150 comprises a controllable contactor and the electrical power system 100 is provided with a controller 190 configured to control the controllable contactor. The controller 190 may monitor an electric current being conducted through the electrical power system 100 between the electrical power source 110 and the electrical network 130 using a sensor. The sensor may comprise, for example, a Hall effect sensor, a fibre optic current sensor and/or a fluxgate sensor. However, it will be appreciated that the controllable circuit interruption device 150 may be configured to monitor the electrical current being conducted through the electrical power system 100 between the electrical power source 110 and the electrical network 130 and control its own operation based on the monitored electrical current. The controller 190 may therefore form part of the controllable circuit interruption device 150 itself.

If the response time period of the controllable circuit interruption device 150 is longer than the critical time period, the controllable circuit interruption device 150 is not able to interrupt the fault current before the critical time period has elapsed. As a consequence, damage to or loss of function of the current limiting diode 140 may follow. Subsequently, the current limiting diode 140 may no longer be able to limit the fault current, which in turn is liable to cause damage to other components of an electrical power system and pose a safety risk. A safety-time margin of the electrical power system 100 is defined as a difference between the response time period of the controllable circuit interruption device 150 and the critical time period. An elongated safety-time margin is associated with an improved safety of the electrical power system 100.

It will be appreciated that a location of the controllable circuit interruption device 150 within the electrical power system 100 may be varied without affecting the intended function of the controllable circuit interruption device 150 as part of the electrical power system 100. For illustration, FIG. 1 shows a plurality of positions within the electrical power system 100 at which the controllable circuit interruption device 150 may be located. The plurality of positions includes but is not limited to a first position 150A, a second position 150B and a third position 150C. In a similar way, it is to be appreciated that a location of the current limiting diode 140 within the electrical power system 100 may be varied without affecting the intended function of the current limiting diode 140 as part of the electrical power system 100. In some examples, a plurality of controllable circuit interruption devices 150 may be provided in different locations within the electrical power system 100, such as at some or all of positions 150A-150C.

In this example, the current limiting diode 140 is provided with a heat sink 148. The heat sink 148 is configured to absorb heat from the current limiting diode 140 in the fault condition. The heat absorbed by the heat sink 148 in the fault condition elongates the critical time period by reducing a rate of change of the maximum internal temperature of the current limiting diode 140. Accordingly, the elongation of the critical time period increases the safety-time margin of the electrical power system 100 and is therefore associated with an improved safety of the electrical power system 100. In addition, the provision of the heat sink 148 to the current limiting diode 140 may permit a controllable circuit interruption device 150 having a relatively long response time period which would otherwise render it unsuitable for use in conjunction with the current limiting diode 140 to be used as part of the electrical power system 100.

The heat sink 148 may comprise a phase-change material. The phase-change material is configured to absorb heat from the current limiting diode 140 in the fault condition by changing phase. In particular, the phase-change material is configured to absorb heat energy from the current limiting diode 140 by means of a substantially constant-temperature heat absorption process. Consequently, the phase-change material can absorb a significant amount of heat from the current limiting diode 140 without necessitating a rise in the maximum internal temperature of the current limiting diode 140. The heat absorbed by the phase-change material in the fault condition by means of the substantially constant-temperature heat absorption process further elongates the critical time period.

The electrical power source 110 is configured to provide a first electrical potential difference to the power electronics converter 120. The power electronics converter 120 is configured to convert and/or regulate the electrical potential difference provided by the electrical power source 110 and provide a second electrical potential difference to the electrical network 130. Accordingly, the power electronics converter 120 provides a regulation function to the electrical power system 100. In particular, the power electronics converter 120 allows the first electrical potential difference to change while providing a substantially constant second electrical potential difference to the electrical network 130. The electrical network 130 may comprise at least one load component which benefits from being driven by a substantially constant electrical potential difference. In addition, the electrical network 130 may require the supply of a pre-determined electrical potential difference for optimal operation thereof. The pre-determined electrical potential difference is referred to as the electrical network 130 voltage demand.

The power electronics converter 120 may be configured to provide a second electrical potential difference to the electrical network 130 which is greater than the first electrical potential difference provided by the electrical power source 110 in a boost regulation mode of the power electronics converter 120. A ratio of the second electrical potential difference provided to the electrical network 130 by the power electronics converter 120 and the first electrical potential difference provided by the electrical power source 110 in the boost regulation mode is governed by a boost duty cycle of the power electronics converter 120.

A magnitude of the boost duty cycle is associated with an efficiency of the power electronics converter 120 in the boost regulation mode. By way of example, if the power electronics converter 120 is configured to provide a second electrical potential difference to the electrical network 130 which is significantly greater than the first electrical potential difference provided by the electrical power source 110 in the boost regulation mode, the magnitude of the boost duty cycle of the power electronics converter 120 will increase. An increase in the magnitude of the boost duty cycle of the power electronics converter is associated with a decrease in the efficiency of the power electronics converter 120 in the boost regulation mode.

Additionally or alternatively, the power electronics converter 120 may be configured to provide a second electrical potential difference to the electrical network 130 which is lower than the first electrical potential difference provided by the electrical power source 110 in a buck regulation mode of the power electronics converter 120. A ratio of the second electrical potential difference provided to the electrical network 130 by the power electronics converter 120 and the first electrical potential difference provided by the electrical power source 110 in the buck regulation mode is governed by a buck duty cycle of the power electronics converter 120.

A magnitude of the buck duty cycle is associated with an efficiency of the power electronics converter 120 in the buck regulation mode. By way of example, if the power electronics converter 120 is configured to provide a second electrical potential difference to the electrical network 130 which is significantly lower than the first electrical potential difference provided by the electrical power source 110 in the buck regulation mode, the magnitude of the buck duty cycle of the power electronics converter 120 will increase. An increase in the magnitude of the buck duty cycle of the power electronics converter is associated with a decrease in the efficiency of the power electronics converter 120 in the buck regulation mode.

Consequently, in order to optimise the efficiency of the power electronics converter 120 (and therefore the efficiency of the electrical power system 100), the first electrical potential difference provided to the power electronics converter 120 by the electrical power source 110 should not be significantly greater than nor significantly lower than the electrical network 130 voltage demand of the electrical network 130.

The electrical power source 110 may be configured to provide an electrical potential difference that is within 20% of the voltage demand so as to optimise the efficiency of the power electronics converter 110. In other examples, the electrical power source is configured to provide an electrical potential difference which is within 10% or within 5% of the voltage demand. In examples, the electrical network 130 voltage demand may be 270 V, 540 V, 800V or 1080 V.

The electrical power source 110 may comprise, for example, a battery, a capacitor and/or an ultracapacitor. The electrical power source 110 may comprise a high-density battery.

In the example shown in FIG. 1, the first example electrical power system 100 comprises a plurality of additional components. In FIG. 1, the plurality of additional components includes a first DC capacitor 172, a second DC capacitor 174, a third DC capacitor 176 and an earth ground 178. It will be appreciated that these components are shown and described for the purpose of illustration and are not to be construed as essential elements of the first electrical power system 100.

Figure 2:
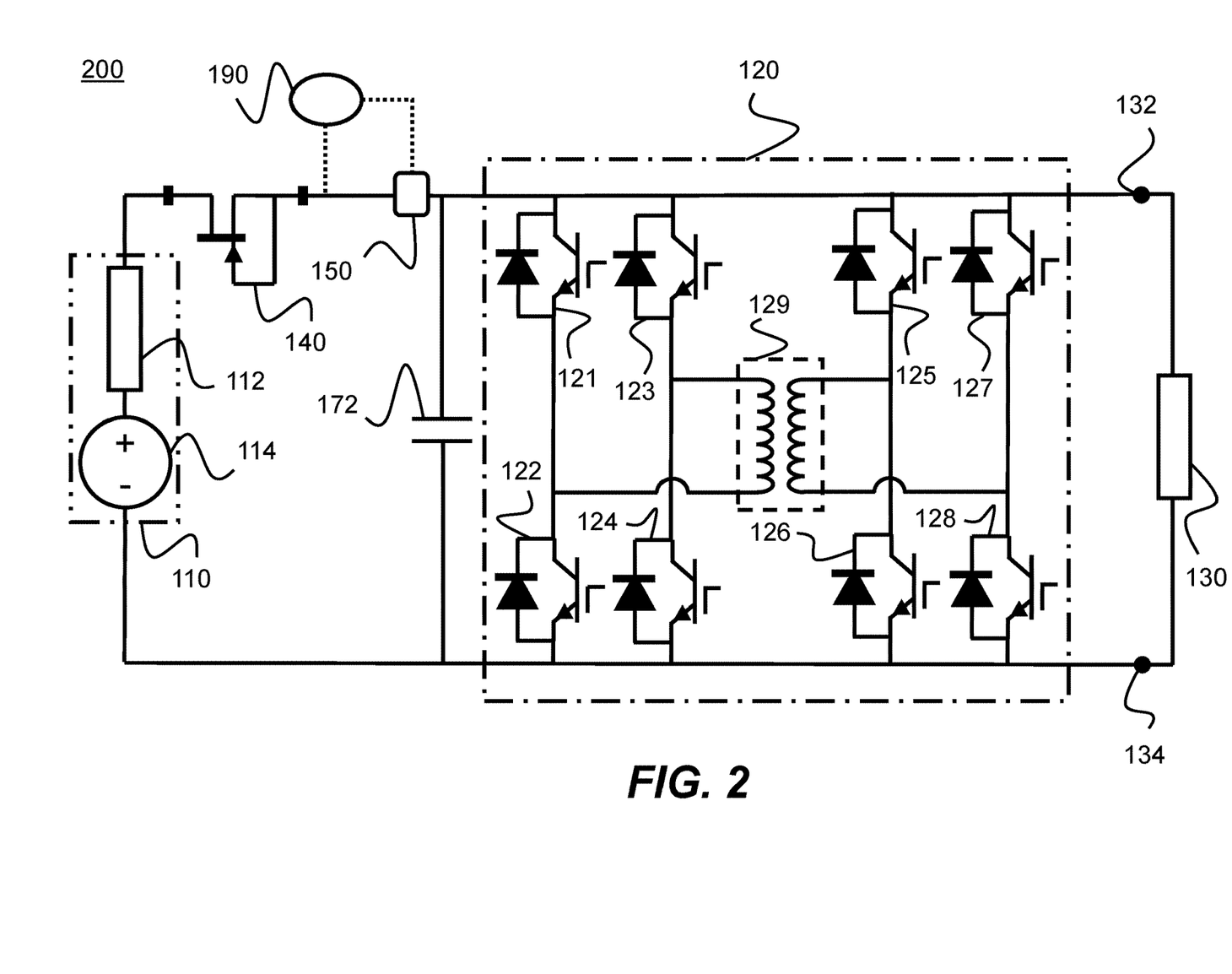
FIG. 2 is a circuit diagram which shows a second example electrical power system.

FIG. 2 shows a second example electrical power system 200. Many of the components of the second electrical power system 200 are similar to or identical to the components of the first electrical power system 100, with like reference numerals indicating similar or identical components.

In the example shown in FIG. 2, the power electronics converter 120 comprises a DC to AC to DC converter. The DC to AC to DC converter comprises a plurality of transistors 121-128 and a transformer 129. The transformer 129 provides magnetic coupling (i.e. inductive coupling) between the electrical power source 110 and the electrical network 130 while maintaining a Galvanic isolation therebetween. The Galvanic isolation between the electrical power source 110 and the electrical network 130 is associated with an improved safety of the electrical power system 200.

Figure 3:
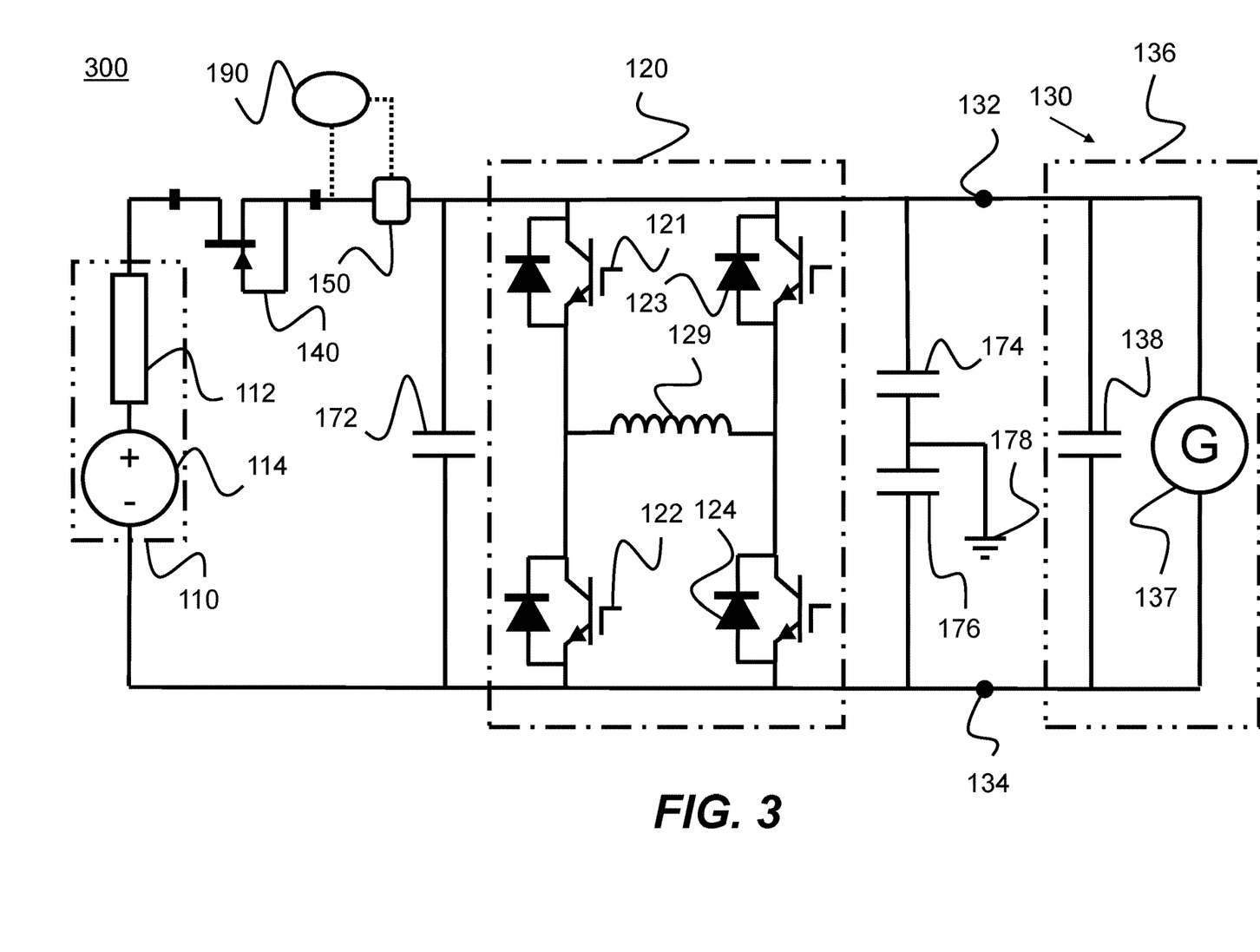
FIG. 3 is a circuit diagram which shows a third example electrical power system.

FIG. 3 shows a third example electrical power system 300. Many of the components of the second electrical power system 300 are similar to or identical to the components of the first electrical power system 100 and the second electrical power system 200, with like reference numerals indicating similar or identical components.

In the example shown in FIG. 3, the electrical power source 110 is a first electrical power source, and the electrical network 130 connected between terminals 132 and 134 comprises a second electrical power source 136. By way of example, FIG. 3 shows the second electrical power source 136 as comprising an electrical generator 137 and a capacitor 138. However, it will be appreciated than the second electrical power source may comprise only one of or neither of the electrical generator 137 and the capacitor 138.

Figure 4:
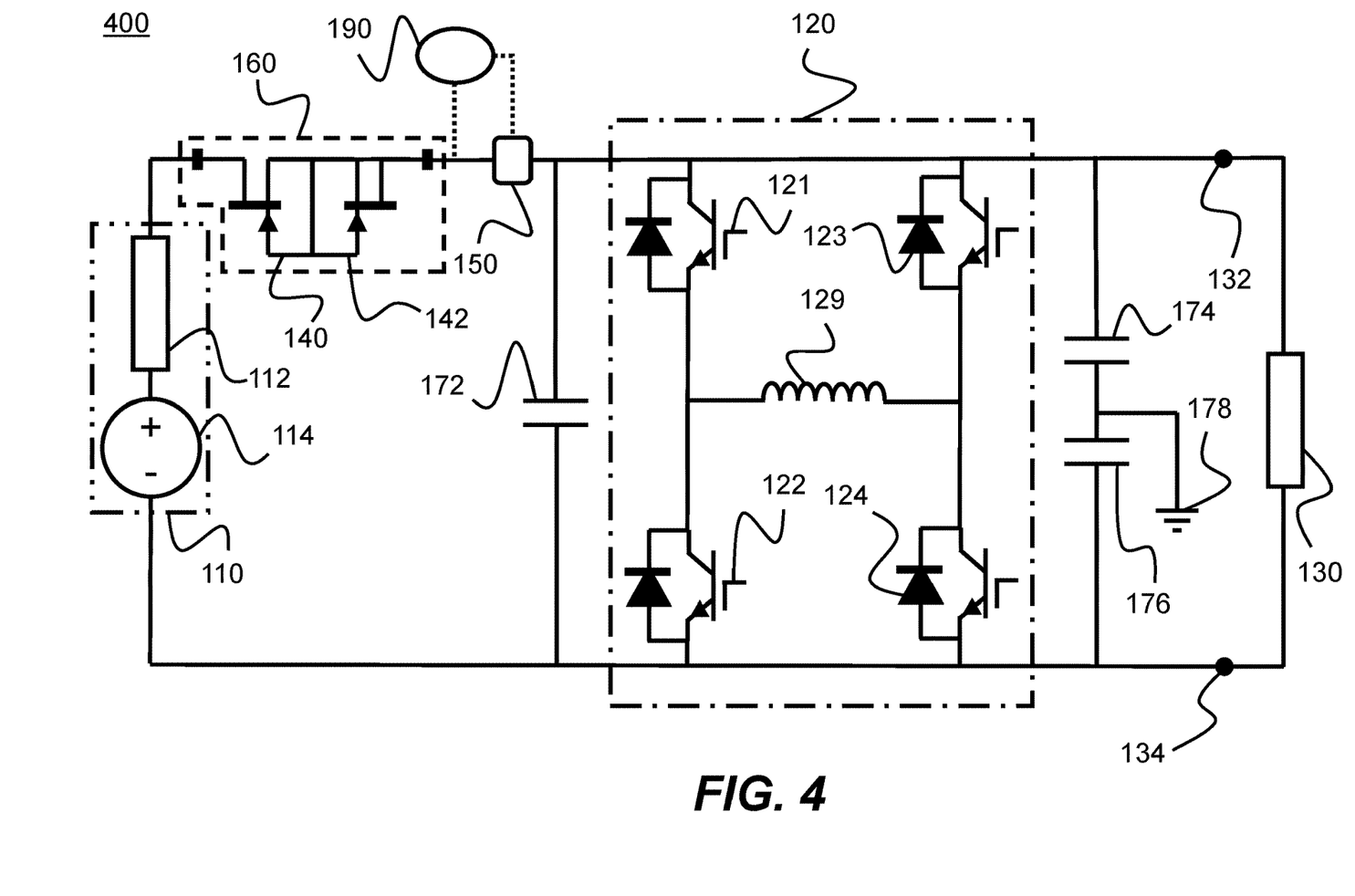
FIG. 4 is a circuit diagram which shows a fourth example electrical power system.

FIG. 4 shows a fourth example electrical power system 400. Many of the components of the second electrical power system 400 are similar to or identical to the components of the first electrical power system 100, the second electrical power system 200 and the third electrical power system 300, with like reference numerals indicating similar or identical components.

In the example of FIG. 4, the current limiting diode 140 is a first current limiting diode. The example electrical power system 400 is also provided with a second current limiting diode 142. The first and second current limiting diodes 140, 142 form a current limiting device 160. Like the first current limiting diode 140, the second current limiting diode 142 comprises a junction field-effect transistor (JFET) provided with a source, a drain and a gate, with the gate being shorted to the source and the drain being electrically connected to the source by an n-channel. Each current limiting diode may have any of the features described in relation to the current limiting diode 140 as shown in FIGS. 1-3. For example, each current limiting diode and/or the current limiting device 160 as a whole may be provided with a heat sink 148 as described with respect to the first electrical power system 100.

The source of the first current limiting diode 140 and the source of the second current limiting diode 142 are electrically connected in series. As such, the first current limiting diode 140 and the second current limiting diode 142 are electrically connected so that the current limiting device 160 is bidirectional. Accordingly, the bidirectional current limiting device 160 is configured as a 2-terminal device which permits an electric current to be conducted between the drain of the first current limiting diode 140 and the drain of the second current limiting diode 142 through the n-channel of each current limiting diode.

A relationship between an electrical resistance of the bidirectional current limiting device 160 and a magnitude of an electric current passing from the drain to the source of the first current limiting diode 140 is highly non-linear. Similarly, a relationship between the electrical resistance of the bidirectional current limiting device 160 and a magnitude of an electric current passing from the drain to the source of the second current limiting diode 142 is highly non-linear.

In other words, the bidirectional current limiting device 160 operates in a manner which is analogous to a highly non-linear bidirectional resistor in that the electrical resistance of the bidirectional current limiting device 160 increases rapidly as the magnitude of an electric current passing through the bidirectional current limiting device 160 in either direction increases above a saturation threshold. Accordingly, the bidirectional current limiting device 160 "saturates" at a near constant current level.

In one example, it may be that a fault originates from the electrical network 130 or the power electronics converter 120 and a fault current is therefore conducted from the drain to the source of the first current limiting diode 140. If the fault current exceeds the saturation threshold of the first current limiting diode 140, the first current limiting diode 140 almost instantaneously limits the magnitude of the fault current caused by the fault originating from the electrical network 130 or the power electronics converter 120 by providing a greatly increased resistance through the n-channel of the first current limiting diode 140.

In another example, it may be that a fault originates from the electrical power source 110 and a fault current is therefore conducted from the source to the drain of the second current limiting diode 142. If the fault current exceeds the saturation threshold of the second current limiting diode 142, the second current limiting diode 142 almost instantaneously limits the magnitude of the fault current caused by the fault originating from the electrical power source 110 by providing a greatly increased resistance through the n-channel of the second current limiting diode 142.

Consequently, the bidirectional current limiting device 160 is configured to limit the magnitude of a fault current caused by a fault originating from the electrical network 130 and/or to limit the magnitude of a fault current caused by a fault originating from the electrical power source 110. Accordingly, the current limiting device 160 and the controllable circuit interruption device 150 are configured to co-operate in use so as to limit and then to interrupt a fault current caused by a fault originating from the electrical network 130 and/or a fault current caused by a fault originating from the electrical power source 110. In other words, the bidirectional current limiting device 160 is able to limit a fault current caused by a fault originating from the electrical network 130 or the power electronics converter 120 or a fault current caused by a fault originating from the electrical power source 110 irrespective of an orientation of the bidirectional current limiting device 160 within the electrical power system 400. Consequently, the bidirectional current limiting device 160 and the controllable circuit interruption device 150 provide the electrical power system 400 with a more versatile resettable protection system against a fault current passing between the electrical power source 110 and the electrical network 130 in the fault condition.

A further advantage of the arrangements described herein may be that circuit interruption devices 150 with relatively low current ratings may be selected for use. In the absence of the current limiting diodes/devices 140, 142, 160, circuit interruption devices 150 are difficult to rate because of the high fault currents and high pulse currents drawn by some converters 120. This difficulty in rating would invariably result in over-rating which may be associated with e.g., increased component mass and increased switching time.

However, with the combination of a current limiting diode/device 140, 142, 160 and a controllable circuit interruption device 150, a controllable circuit interruption device 150 with a relatively low current rating may be selected because the fault current level and pulse current level at which the circuit interruption device 150 must be operable is both reduced and subject to less uncertainty.

The current rating of the circuit interruption device 150 will be at least equal to the normal current rating of the electrical power source 110 and is preferably be less than five times the normal current rating of the electrical power source 110. In one particular example the current rating of the circuit interruption device 150 is between 1.5 and 2.0 times the current rating of the electrical power source 110. Where the electrical power source 110 is a battery, the normal current rating will be understood to refer to the current output by the battery to a connected load in the absence of a fault and at full battery charge.

In all examples described above, the channel that connects the source and drain of each current limiting diode is an n-channel. Those skilled in the art will appreciate that the channel could, in principle, instead be a p-channel, doped such that the majority carriers are 'holes' instead of electrons. The mobility of charge carriers in n-channel devices is typically significantly higher than those in p-channel devices, however, such that n-channel devices are generally preferred.

Figure 5:
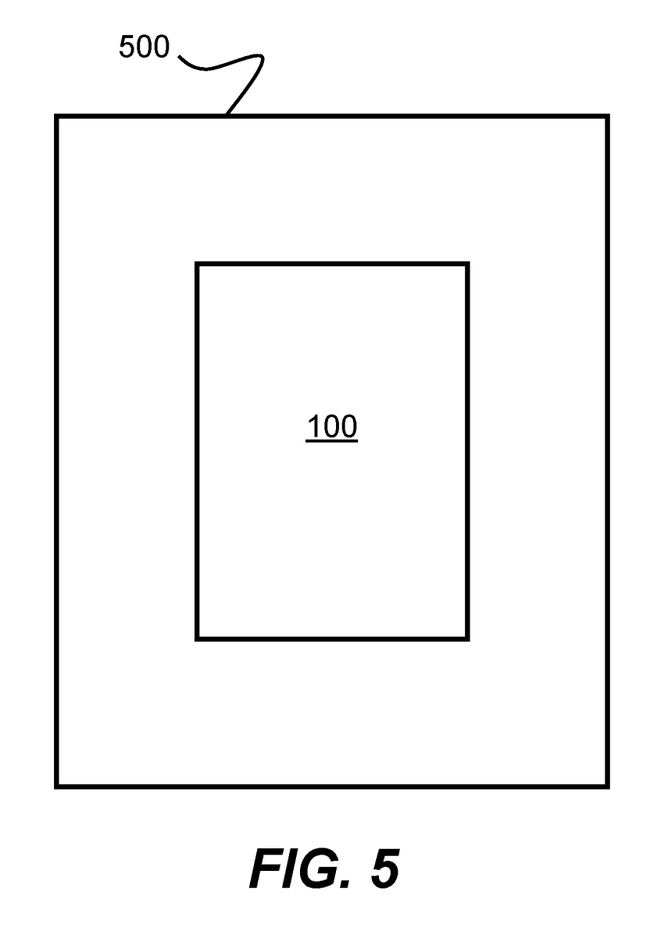
FIG. 5 shows an example aircraft power and propulsion system comprising an example electrical power system.

FIG. 5 shows an example aircraft power and propulsion system 500 comprising an electrical power system 100. The electrical power system 100 may be in accordance with any of the example electrical power systems described with respect to FIGS. 1-4.

Figure 6:
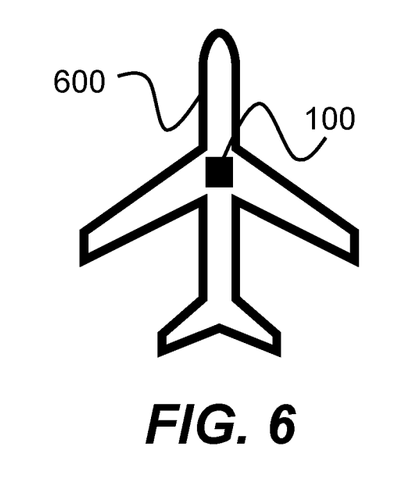
FIG. 6 shows an aircraft comprising the example electrical power system.

FIG. 6 shows an aircraft 600 comprising an electrical power system 100. The electrical power system may be in accordance with any of the example electrical power systems described with respect to FIGS. 1-4 or the aircraft power and propulsion system 500 of FIG. 5.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electrical power system comprising: an electrical power source, a power electronics converter, an electrical network, a current limiting diode and a controllable circuit interruption device, wherein:

the current limiting diode includes a junction field-effect transistor (JFET) provided with a source, a drain, and a gate shorted with the source, and is configured to limit a fault current passing between the electrical power source and the electrical network in a fault condition;

the controllable circuit interruption device is configured to interrupt the fault current in response to a determination that the electrical power system is in the fault condition;

the controllable circuit interruption device is connected to the source of the current limiting diode on one side and is connected to the electrical network on another side, and the electrical power source is connected to the drain of the current limiting diode, and a current rating of the controllable circuit interruption device is between one and three times a current rating of the electrical power source.

2. The electrical power system of claim 1, wherein the current rating of the controllable circuit interruption device is between 1.25 and 2.5 times the current rating of the electrical power source.

3. The electrical power system of claim 1, wherein the current rating of the controllable circuit interruption device is between 1.5 and 2.0 times the current rating of the electrical power source.

4. The electrical power system of claim 1, wherein the controllable circuit interruption device comprises a controllable contactor and the electrical power system further comprises a controller configured to control the controllable contactor.

5. The electrical power system of claim 1, wherein the current limiting diode is provided with a heat sink.

6. The electrical power system of claim 5, wherein the heat sink provided to the current limiting diode comprises a phase-change material configured to absorb heat from the current limiting diode in the fault condition.

7. The electrical power system of claim 1, wherein the electrical power source is configured to provide an electrical potential difference to the electrical power system of at least 270 V.

8. The electrical power system of claim 1, wherein the electrical power source comprises a battery.

9. The electrical power system of claim 1, wherein the power electronics converter comprises a DC to DC converter.

10. The electrical power system of claim 1, wherein the power electronics converter comprises a DC to AC to DC converter.

11. The electrical power system of claim 1, wherein the electrical power source is a first electrical power source, and wherein the electrical network comprises a second electrical power source.

12. The electrical power system of any claim 11, wherein the second electrical power source comprises an electrical generator and/or a capacitor.

13. The electrical power system of claim 1, wherein the current limiting diode is a first current limiting diode, and wherein the electrical power system further comprises a second current limiting diode, the first current limiting diode and the second current limiting diode being electrically connected and together forming a bidirectional current limiting device.

14. An aircraft power and propulsion system comprising the electrical power system of claim 1.

15. An aircraft comprising the electrical power system of claim 1.

16. An aircraft comprising the aircraft power and propulsion system of claim 14.

* * * * *